United States Patent [19]

Warmskessel

[11] 3,890,002

[45] June 17, 1975

[54] SEAT BELT ARRANGEMENT
[75] Inventor: Terry L. Warmskessel, Wescoesville, Pa.
[73] Assignee: Mack Truck, Inc., Allentown, Pa.
[22] Filed: May 10, 1973
[21] Appl. No.: 359,190

[52] U.S. Cl................................. 297/385; 248/393
[51] Int. Cl............................................. A62b 35/00
[58] Field of Search....... 297/385, 216; 280/150 SB; 296/65 A, 65 R; 248/393

[56] References Cited
UNITED STATES PATENTS

| | | | |
|---|---|---|---|
| 3,136,579 | 6/1964 | Hunter | 297/385 |
| 3,377,102 | 4/1968 | Henrikson | 297/385 |
| 3,451,719 | 6/1969 | De Lorean | 297/216 X |
| 3,463,543 | 8/1969 | Zellar | 297/216 |
| 3,582,133 | 1/1971 | DeLavenne | 297/216 X |
| 3,804,434 | 4/1974 | Lacey | 297/385 X |

Primary Examiner—James T. McCall
Attorney, Agent, or Firm—Brumbaugh, Graves, Donohue & Raymond

[57] ABSTRACT

In a seat belt arrangement for a vehicle seat, a portion of which is movable relative to the vehicle structure, an anchor assembly secures the seat belt to the vehicle structure. In addition, a coupling assembly releasably attaches the seat belt to the movable portion of the vehicle seat and slack is provided in the seat belt between the anchor assembly and the coupling assembly to permit limited relative movement between the movable portion of the vehicle seat and the vehicle structure. The portion of the seat belt which engages an occupant of the vehicle seat normally is secured by the coupling assembly to the movable portion of the vehicle seat. When a load greater than a predetermined impact load is exerted on the seat belt, however, the coupling assembly releases the occupant engaging portion of the seat belt, thereby transmitting the load to the anchor assembly.

10 Claims, 10 Drawing Figures

PATENTED JUN 17 1975　　3,890,002

SHEET　　1

SEAT BELT ARRANGEMENT

BACKGROUND OF THE INVENTION

It is a common practice to provide certain vehicles, such as large trucks, with a suspension seat for the driver, at least, to increase his comfort and driving effectiveness. Suspension seats moderate the effects of sudden vehicle movements normally encountered in driving by permitting relative vertical movement between the seat and the vehicle cabin. Some suspension seats also permit relative fore and aft horizontal movement between the seat and cabin.

If a suspension seat is provided with a seat belt that is anchored to the floor of a vehicle cabin, for example, or to the lower seat frame secured thereto, the relative movement of the suspension seat causes the seat belt, when pulled snugly across the hips of an occupant of the seat in the proper manner, to tug against the occupant's body. Such tugging action naturally is uncomfortable for the occupant of the seat and thus encourages disuse of the seat belt. If the seat belt is anchored to the upper portion of the suspension seat, however, so that the seat belt moves with the seat relative to the vehicle cabin, the upper portion of the suspension seat must be able to withstand the full occupant load, as defined by the Federal Motor Vehicle Safety Standards. Such an arrangement would necessitate substantial redesigning of most presently used suspension seats and would increase the ultimate cost of suspension seats capable of meeting the federal standards.

SUMMARY OF THE INVENTION

The present invention overcomes the problems noted above in providing a seat belt for a suspension seat, or any other seat that is movable relative to the structure of the vehicle in which it is used, by anchoring the seat belt to the vehicle structure to provide the necessary load capacity and, at the same time, releasably coupling the seat belt to the movable portion of the seat to eliminate relative movement between the occupant engaging portion of the seat belt and the movable portion of the seat when the seat belt is properly adjusted about the occupant. Specifically, the present invention comprises, for each half of a conventional seat belt, an anchor assembly securing the seat belt to a portion of the vehicle structure and a coupling assembly releasably attaching the seat belt to the movable portion of the vehicle seat. Sufficient slack is provided in the seat belt between the anchor assembly and the coupling assembly to permit, for example, normal relative motion between a suspension seat and a motor vehicle cabin. The portion of the seat belt which engages an occupant of the seat normally is secured by the coupling assembly to the movable portion of the vehicle seat. Thus, an occupant of the vehicle seat can draw the seat belt snugly across his body in the recommended manner and not interfere with the relative movement between the movable portion of the seat and the vehicle cabin, for example.

When a load greater than a predetermined impact load is exerted on the seat belt, the coupling assembly releases the occupant engaging portion of the seat belt, thereby transmitting the load to the seat belt anchor assembly. The predetermined impact load is selected so that the load transmitted to the movable portion of the vehicle seat will not exceed the structural capacity of the movable portion of the seat. In the event of a sudden stop or collision, therefore, the impact load exerted on the seat belt will be transmitted to the seat belt anchor assembly, which provides the seat belt with the necessary load capacity to meet the Federal Motor Vehicle Safety Standards.

The releasable coupling assembly for the present invention may be formed in any convenient manner so that it will release when an appropriate load is applied, without damaging either the seat belt or the vehicle seat. In one embodiment, the releasable coupling assembly includes a bracket assembly and a screw attaching the bracket assembly to the movable portion of the vehicle seat. The shear strength of the screw is such that when a shear load corresponding to a load on the seat belt greater than the predetermined impact load is exerted on the screw, the screw will shear off and release the seat belt from the movable portion of the seat. The bracket assembly may be retrieved and reused, if desired, by simply providing a replacement shear screw. The seat belt may be secured to the bracket assembly either by being wrapped around the members of the assembly or by having a strip of material looped around the bracket assembly and sewn at each end to the seat belt.

Another embodiment of the coupling assembly includes a spring-loaded clamp assembly secured to the movable portion of the vehicle seat. The clamp assembly has two clamping surfaces which engage the seat belt and frictionally restrain the seat belt from being pulled through the clamp assembly. The clamp assembly may also include a hand engageable member for adjusting the clamping pressure exerted by the clamping surfaces and thereby selectively adjusting the impact load at which the seat belt will be released.

In a further embodiment, the coupling assembly includes a U-shaped bracket member secured to the movable portion of the seat and a strip of material that forms a loop and is secured to the seat belt. The seat belt passes through the opening between the bracket member and the movable portion of the vehicle seat, but the loop of material normally has dimensions that are greater than the dimensions of the opening and the loop thereby prevents the seat belt from moving freely through the opening. Upon the application of a load on the seat belt greater than the predetermined impact load, the loop of material is deformed, for example by being folded back on itself, to permit the seat belt to move through the opening formed by the bracket, thereby transmitting the load to the seat belt anchor assembly. The loop of material may also enclose a resilient member, such as a length of rubber tubing, which must be deformed before the seat belt can move through the bracket opening.

Still another embodiment of the coupling assembly includes a U-shaped bracket member secured to the movable portion of the vehicle seat and a loop formed around the bracket by sewing together two portions of the seat belt located on either side of the bracket member. The stitching holding the loop fails upon the application of appropriate loads on the seat belt.

The coupling assembly, in yet another embodiment, includes a clip member secured at one end to the seat belt and secured by a bolt at its other end to the movable portion of the vehicle seat. The clip is designed to fail and release the seat belt upon the application of appropriate loads on the seat belt.

As can be seen from the above description, the present invention encourages the use of vehicle seat belts in vehicles provided with seats that are movable relative to some portion of the vehicle structure. The present invention insures that such seat belts are comfortable to a user when properly adjusted and have the necessary load capacity, without requiring the vehicle seats to have intricate and costly mountings and without sacrificing any relative movement possible between the vehicle seats and the vehicle structure. The invention is particularly applicable to suspension seats used in large trucks and similar motor vehicles, but it may also be used with other types of seats and with other types of vehicles in which the advantages of the invention are desirable.

BRIEF DESCRIPTION OF THE DRAWINGS

For a better understanding of the invention, reference may be made to the following description of various exemplary embodiments, taken in conjunction with the figures of the accompanying drawings, in which.

DESCRIPTION OF EMBODIMENTS

Figure 1:
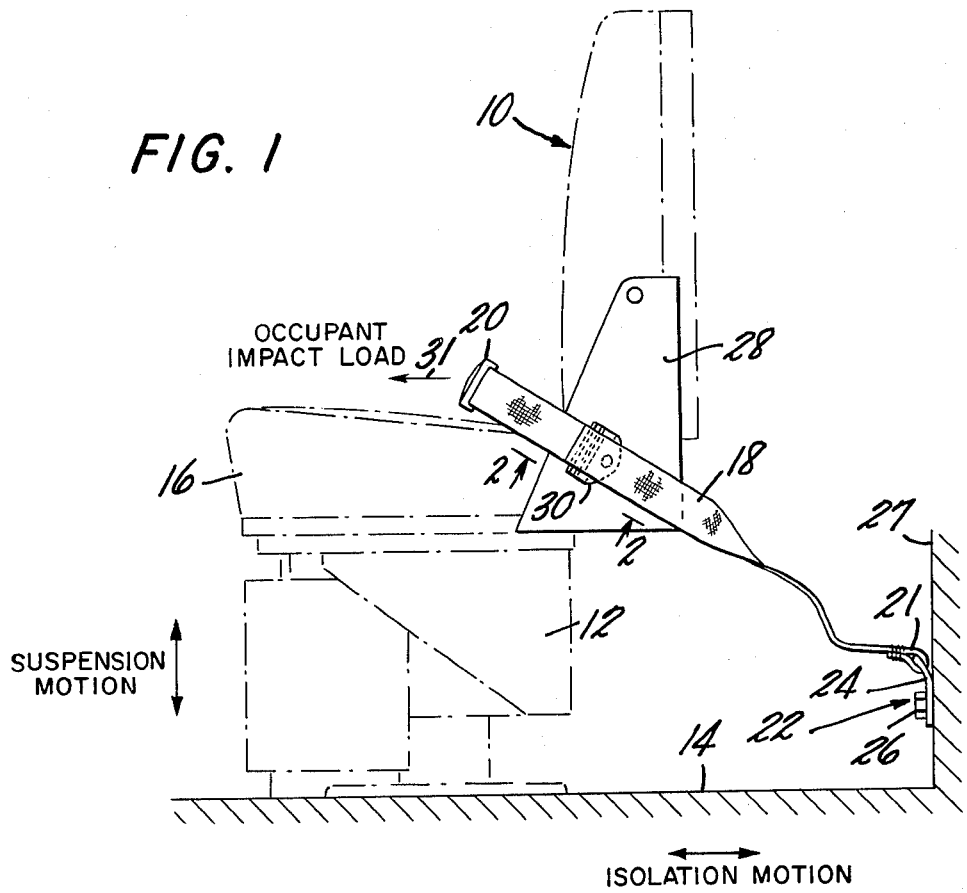
FIG. 1 is an elevational view of a seat belt arrangement according to the invention mounted on a vehicle suspension seat shown partially in phantom.

Referring to the drawings, FIG. 1 shows a vehicle suspension seat 10 (shown in phantom) in place in the cabin of a vehicle, such as a large truck. The base portion 12 of the seat 10 is secured to the floor 14 of the vehicle cabin and supports the upper portion 16 of the seat 10. The upper portion 16 of the seat 10 is mounted on the base portion 12 in any convenient manner to permit relative vertical movement, designated "suspension motion" in FIG. 1, between the upper portion 16 of the seat 10 and the floor 14 of the vehicle cabin. Although it is not an essential feature of a suspension seat, the upper portion 16 of the illustrated seat 10 is also capable of relative fore and aft horizontal movement, designated "isolation motion" in FIG. 1, relative to the floor 14 of the vehicle cabin.

The suspension seat 10 is provided with a seat belt 18, which is manufactured in any convenient configuration. Such a seat belt 18 typically comprises two lengths of fabric extending around either side of the seat 10 and joined together by a buckle 20. For clarity, only one of the lengths of fabric comprising the seat belt 18 is shown in the drawings. As shown in FIG. 1, each half of the seat belt 18 has a loop 21 in one end which engages an anchor assembly 22 comprising a slotted bracket member 24 secured by a bolt 26 to the rear vertical wall 27 of the vehicle cabin. It is within the scope of the invention, however, to anchor the seat belt 18 to any portion of the vehicle structure which does not move with the upper portion 16 of the seat 10 and which will provide the necessary load bearing capacity to permit the seat belt 18 to meet applicable safety standards.

The seat belt 18 is attached to part of each side of the upper portion 16 of the suspension seat 10, for example to a side member 28, by a releasable coupling assembly 30. Sufficient slack is left in the seat belt 18 between the coupling assembly 30 and the anchor assembly 22 to permit suspension and isolation motions of the upper portion of the suspension seat 10 with respect to the vehicle cabin. The coupling assembly 30 need not immovably fix a portion of the seat belt 18 to the side member 28, but need only prevent movement of the seat belt in the general direction of the arrow 31, labeled "occupant impact load" in FIG. 1, beyond a predetermined point on the seat belt. In other words, when the seat belt 18 is in use, it remains snugly adjusted about an occupant of the seat 19 during normal driving motions of the upper portion 16 of the suspension seat.

Figure 2:
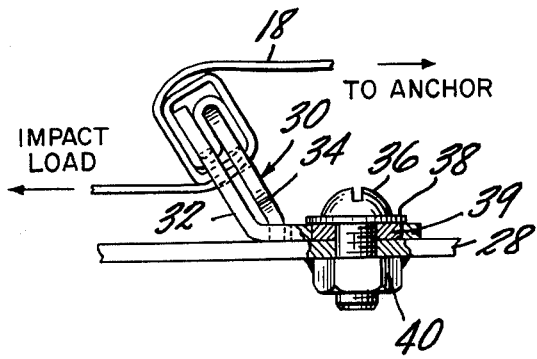
FIG. 2 is a view taken along the line 2—2 of FIG. 1 and looking in the direction of the arrows.
Figure 3:
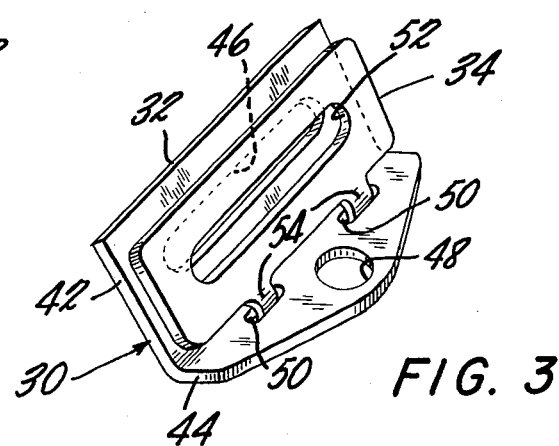
FIG. 3 is a perspective view of the bracket assembly shown in FIG. 1.
Figure 4:
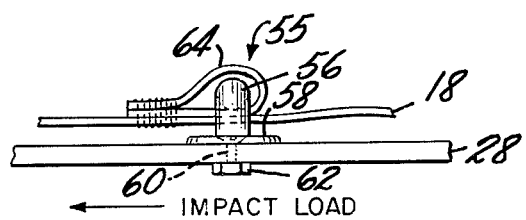
FIG. 4 is a plan view of a second embodiment of a coupling assembly according to the invention.

As shown more clearly in FIGS. 2 and 3, the coupling assembly 30 includes two slotted metal bracket members 32 and 34, a shear screw 36, a washer 38, a spacer 39, and a nut 40. The bracket member 32 is bent along its length so that it defines an obtuse angle in transverse cross-section, one leg 42 of the bracket member 32 having a rectangular shape in plan and the other leg 44 of the bracket member 32 having a generally triangular shape in plan. The rectangular leg 42 of the bracket member 32 includes a centrally located, oblong slot 46 and the triangular leg 44 includes a circular hole 48 and two small oblong slots 50 on either side of and below the circular hole 48. As can be seen in FIG. 2, the washer 38 is slipped over the screw 36 and the screw 36 is passed through the spacer 39, which is received in the circular opening 48 in the leg 44 of the bracket member 32, and a corresponding hole in the seat side member 28. The screw 36 is then screwed into the nut 40 to hold the bracket member 32 in place on the side member 28. The spacer 39 insures that the bracket member 32 is free to rotate about the axis of the screw after the coupling assembly 30 has been mounted on the side member 28. To insure that the shear screw 36 being used is of the proper size, for reasons that will be explained hereinafter, the nut 40 is welded to the side member 28.

The second bracket member 34 of the coupling assembly 30 is generally rectangular in shape with a centrally located, oblong opening 52 similar to the opening 46 in the bracket member 32. The bracket member 34 also has two lugs 54 which project from one longitudinal side thereof and are inclined at an angle from the plane of the rectangular portion thereof. The lugs 54 engage the oblong slots in the leg 44 of the bracket member 32 and the angles of the lugs 54 and the two legs 42 and 44 of the bracket member 32 are interrelated so that when the lugs 54 are received in the slots 50, the bracket member 34 and the leg 42 of bracket member 32 are in parallel relationship with their slots 46 and 52 aligned.

The seat belt 18 is engaged by the coupling assembly 30 by being wrapped around the two bracket members 32 and 34. Looking at FIG. 2 and beginning on the side of the coupling assembly 30 closest to the buckle end of the seat belt 18, the seat belt is first passed through the aligned openings 46 and 52 of the two bracket members 32 and 34, respectively, and over the tops of both bracket members 32 and 34. After being passed again through the opening 46, the seat belt 18 is extended upwardly between the two bracket members 32 and 34 and over the top of the second bracket member 34. The seat belt 18 is then passed back through both aligned openings 52 and 46 in the direction opposite to that in which it was passed previously. The belt is finally wrapped over the tops of both bracket members 32 and 34 and extended back to the bracket 24, which anchors to the vehicle cabin the end of the seat belt 18 remote from the buckle 20. The above described manner of wrapping the seat belt about the bracket members 32 and 34 develops sufficient friction to prevent the seat belt from slipping through the coupling assembly 30 in either direction, while permitting adjustment of the length of the occupant engaging portion of the seat belt to suit a particular occupant.

The shear screw 36 of the coupling assembly 30 shown in FIGS. 1–3 is designed to resist shear loads up to a predetermined maximum. For shear loads exceeding the predetermined maximum shear load, the screw 36 will shear or break off. Shear loads on the screw 36 will be developed as a result of impact loads on the seat belt 18 caused by a collision, for example, and will be transmitted to the screw 36 by the bracket member 32. By selecting a screw 36 having a maximum shear load capacity which corresponds to a selected maximum impact load that the coupling assembly 30 is to withstand, each coupling assembly 30 will release the seat belt 18 from the corresponding suspension seat side member 28 upon the application of a load greater than the predetermined maximum impact load.

The benefits of the above arrangement can be seen by visualizing an individual sitting in the suspension seat 10 of FIG. 1. When the occupant of the seat adjusts the seat belt 18 to his body, the coupling assemblies 30 on the side members 28 of the upper portion 16 of the seat 10 hold the seat belt 18 so that it can be snugly and properly secured across the occupant's hips. Slack in the seat belt 18 remains between each coupling assembly 30 and the corresponding anchor assembly 22, however, to allow relative movement of the upper portion 16 of the suspension seat 10 with respect to the vehicle cabin. In the event of a head-on collision, for example, the occupant of the seat 10 will be thrown in the direction of the arrow 31, labeled "occupant impact load", and his body will exert an impact load on the seat belt 18 and, consequently, on the coupling assemblies 30. By selecting a maximum impact load for the coupling assemblies 30 and a corresponding maximum shear load capacity for the screws 36, the occupant impact load can be transferred from the side members 28 to the brackets 24 and bolts 26 of the anchor assemblies 22 in the rear vertical wall 27 of the vehicle cabin, without damage to the suspension seat 10 or injury to the occupant thereof.

Thus, the occupant of the suspension seat 10 will be encouraged to use the seat belt 18, because the portion of the seat belt that engages his body will move with him and the upper portion 16 of the suspension seat. At the same time, the occupant will be afforded adequate protection by the seat belt 18 and the seat belt anchor assemblies 22. In addition, the shearing failure of the screws 36 permits the coupling assemblies 30 to release the seat belt 18 without damaging the seat assembly. The coupling assemblies 30 can therefore be remounted on the side members 28 simply by replacing the shear screws 36. To insure that over-size and over-strength replacement screws 36 are never accidentally used, nuts 40, which mate with the proper size shear screws, are welded to the side members 28.

FIGS. 4–10 illustrate various other coupling assemblies which may be used in the present invention. The coupling assembly 55 of FIG. 4 includes a U-shaped metal bracket 56, hereinafter referred to as a footman loop, which has a laterally extending ear 58 at the end of each leg of the footman loop 56. A shear screw 60 is inserted into an opening in each of the ears 58 and into a corresponding hole in the side member 28. Each screw 60 is screwed into a nut 62 to hold the footman loop 56 in place.

A strip of material 64, for example a short length of seat belt material, is attached to one side of the seat belt 18, preferably by being sewn thereto. The strip of material 64 is folded over on itself to form a loop which encircles the footman loop 56, while the seat belt 18 passes between the footman loop 56 and the seat side member 28. The shear screws 60, like the screw 36 of FIG. 2, have a maximum shear load capacity which corresponds to the predetermined maximum impact load for the coupling assembly 55. Thus, upon the application of a load on the seat belt and the coupling assemblies 55 greater than the predetermined maximum impact load, the screws 60 will shear off, releasing the footman loops 56 and the seat belt 18 and transferring the impact load to the seat belt anchor assembly (not shown). As in the coupling assembly 30 of FIGS. 1–3, the nuts 62 are preferably welded to the side members 28 to insure that replacement screws 60 are of the proper size.

The ends of the strip of material 64 are sewn to the seat belt 18 on the side of the footman loop 56 on which the impact load will be exerted. Such a location of the stitching helps to insure that the coupling assembly 55 will release by shearing the screws 60 rather than ripping out the stitching holding the strip of material 64 to the seat belt 18, which might happen if the stitching were on the right side of the footman loop 56 as viewed in FIG. 4.

Figure 5:
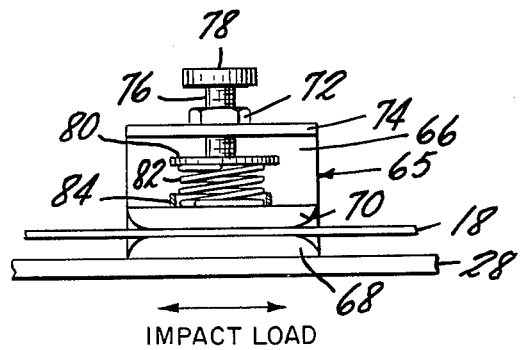
FIG. 5 is a plan view of a third embodiment of a coupling assembly according to the invention.

In the coupling assembly 65 of FIG. 5, a C-shaped bracket 66 is secured to the seat side member 28 by any convenient means, for example by welding. The lower arm of the C-shaped bracket 66 defines a lower pressure plate 68 which, with an independently movable upper pressure plate 70, engages the seat belt 18 passing between the pressure plates 68 and 70. A nut 72 is welded to the upper arm 74 of the C-shaped bracket 66 and a threaded member 76 threadedly engages the nut 72 and extends through an opening in the upper arm 74 of the bracket 66. A hand engageable knob 78 is attached to the upper end of the threaded member 76 and an enlarged disc 80 is attached to the lower end thereof. The lower surface of the disc 80 engages a spring 82 and compresses the spring 82 against the upper surface of the upper pressure plate 70. The lower end of the spring 82 is received in an upstanding ring 84 that is secured to the upper pressure plate 70.

As can be seen from FIG. 5, the spring 82 applies a downward force on the upper pressure plate 70 so that it frictionally engages the seat belt 18 and normally clamps the seat belt against normal loads exerted on the seat belt. Rotation of the threaded member 76 effects selective adjustment of the force applied by the spring 82, and thus selective adjustment of a predetermined impact load at which the seat belt will be released by the coupling assembly 65. The construction of the coupling assembly 65 is such that it will release the seat belt 18 at a selected threshold impact load regardless of the direction in which such load is exerted. Thus, there is no possibility of the seat belt and the coupling assembly being inadvertently improperly assembled.

Figure 6:
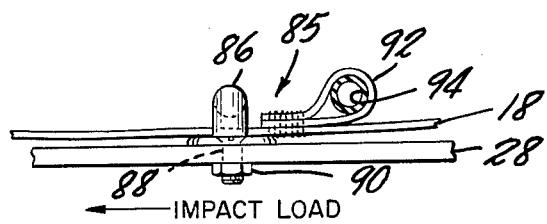
FIG. 6 is a plan view of a fourth embodiment of a coupling assembly according to the invention.

FIG. 6 illustrates a coupling assembly 85 in which a metal footman loop 86 is secured to the seat side member 28 by a pair of screws 88 and nuts 90. A strip of material 92 is formed in a loop and both ends of the strip 92 are sewn, for example, to the seat belt 18. The strip of material 92 is secured to the seat belt 18 on the side of the footman loop 86 away from the buckle end of the belt 18, with the ends of the strip of material 92 directed toward the buckle end of the seat belt 18. A piece of compressible material 94, such as, a length of rubber tubing, is inserted into the loop formed by the strip of material 92 to expand the loop such that it will not pass through the footman loop 86 unless the compressible material 94 is sufficiently compressed. As in the previously described coupling assemblies, the load on the seat belt 18 required to compress the piece of compressible material 94 so as to pull the loop 92 through the footman loop 86 corresponds to a predetermined impact load at which the coupling assembly 85 releases the seat belt and transfers the load from the side member 28 to the corresponding seat belt anchor assembly (not shown).

The structure of the coupling assembly 85 permits the use of conventional spring-loaded seat belt returns with the seat belt 18 for added convenience and improved appearance. Such seat belt returns should be mounted so as not to interfere with the releasable coupling assembly 85 in the event of a collision.

Figure 7:
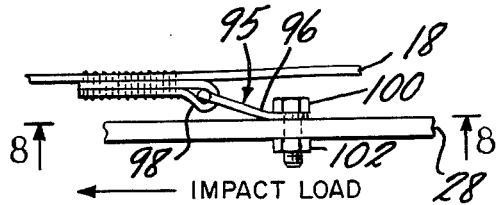
FIG. 7 is a plan view of a fifth embodiment of a coupling assembly according to the invention.
Figure 8:
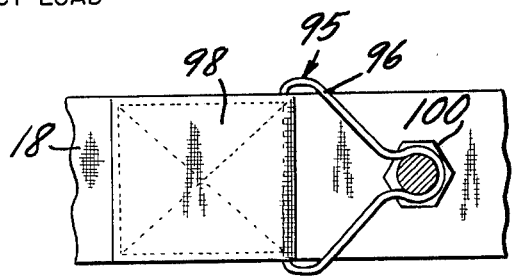
FIG. 8 is a view taken along the line 8—8 of FIG. 7 and looking in the direction of the arrows.

FIGS. 7 and 8 present two views of a coupling assembly 95 which includes a generally triangular wire clip 96. One side of the wire clip 96 is encircled by a strip of material 98, for example a piece of seat belt material, which is folded over to form a loop and is secured to the seat belt 18. The apex of the triangular clip 96 opposite the side of the clip encircled by the strip of material 98 is rounded to provide a close fitting opening through which a bolt 100 is inserted. The bolt 100 extends through both the opening provided by the wire clip 96 and an aligned hole in the seat side member 28 and is screwed into a nut 102.

The wire forming the clip 96 is designed to sustain a tensile stress corresponding to the predetermined maximum impact load that the coupling assembly 95 is designed to resist. Upon the application of a load on the seat belt and the coupling assembly 95 exceeding the predetermined maximum impact load, the wire clip 96 fails and the load is transferred from the side member 28 to the corresponding seat belt anchor assembly (not shown).

Figure 9:
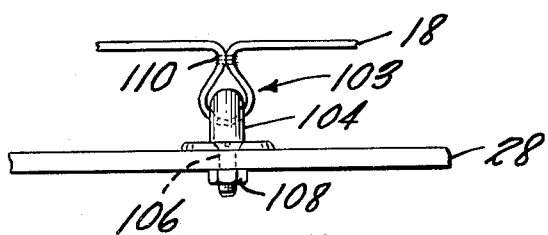
FIG. 9 is a plan view of a sixth embodiment of a coupling assembly according to the invention.

FIG. 9 illustrates a coupling assembly 103 which includes a metal footman loop 104 secured to the seat side member 28 by two screws 106 and two nuts 108. The seat belt 18 is passed through the footman loop 104, and portions of the seat belt 18 on either side of the footman loop are sewn together at 110 to define a loop in the seat belt 18 encircling the footman loop 104. The stitching 110 is designed to fail when a load is applied on the seat belt 18 in excess of the maximum impact load that the coupling assembly is intended to sustain, failure of the stitching 110 transferring the load from the side member 28 to the corresponding seat belt anchor assembly (not shown).

As with the coupling assembly 65 of FIG. 5, the coupling assembly 103 will release the seat belt 18 when the impact load on the seat belt exceeds the predetermined threshold value regardless of the direction in which the impact load is exerted, and so there is no possibility of the seat belt being improperly assembled with the coupling assembly.

Figure 10:
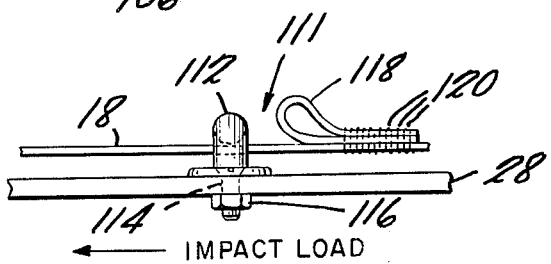
FIG. 10 is a plan view of a seventh embodiment of a coupling assembly according to the invention.

The coupling assembly 111 of FIG. 10 includes a footman loop 112 which is secured to the seat side member 28 by a pair of screws 114 and nuts 116. A strip of material 118, such as a strip of seat belt material, is folded to form a loop and the ends of the strip are sewn at 120 to the seat belt 18 on the side of the footman loop 112 away from the buckle end of the seat belt 18. The loop formed by the strip of material 118 is normally disposed between the stitching 120 and the footman loop 112. When the seat belt 18 is drawn up snugly around the body of an occupant of the seat, the loop defined by the strip of material 118 is folded back on the ends of the strip of material to form a mass of material which can not be pulled through the footman loop 112 except by a load on the seat belt 18 greater than the predetermined impact load that the coupling assembly is designed to sustain. When the loop 118 is pulled through the footman loop 112, the impact load is transferred from the side member 28 to the corresponding seat belt anchor assembly (not shown). Like the coupling assembly 85 of FIG. 6, the coupling assembly 111 can be utilized in a seat belt arrangement that includes springloaded seat belt returns.

It will be understood that the above described embodiments are merely exemplary and that those skilled in the art may make many variations and modifications without departing from the spirit and scope of the invention. All such modifications and variations are intended to be within the scope of the invention as defined in the appended claims.

I claim:

1. In a seat belt arrangement for a vehicle seat, at least a portion of which is movable relative to at least a portion of a vehicle structure, including a seat belt, and means anchoring the seat belt to the portion of the vehicle structure, the improvement comprising means releasably coupling the seat belt to the movable portion of the vehicle seat so as to provide slack in the seat belt between the anchoring means and the releasable coupling means to permit relative movement between the movable portion of the vehicle seat and the portion of the vehicle structure even when a portion of the seat belt is securely engaging an occupant of the seat, the portion of the seat belt adapted to engage an occupant of the vehicle seat being secured by the releasable coupling means to the movable portion of the seat under loads exerted on the seat belt up to a predetermined impact load, the releasable coupling means being adapted to release the occupant engaging portion of the seat belt, with the seat belt being unconstrained by any portion of the coupling means engaging the belt, in response to a load exerted on the seat belt exceeding the predetermined impact load so as to transfer the load on the seat belt from the movable portion of the vehicle seat to the anchoring means.

2. The improvement of claim 1, wherein the releasable coupling means includes a bracket assembly to which the seat belt is secured, and screw means attaching the bracket assembly to the movable portion of the vehicle seat, the screw means being adapted to fail upon application of a load on the screw means corresponding to a load on the seat belt exceeding the predetermined impact load.

3. The improvement of claim 2, wherein the brackets assembly includes two interlocking bracket members having openings formed therein, the seat belt extending through the openings and being wrapped around the bracket members.

4. The improvement of claim 2, wherein the bracket assembly includes a bracket member defining an opening, and wherein the seat belt includes a loop passing around the bracket member.

5. The improvement of claim 4, wherein the loop is formed by a strip of material passing through the opening and around a portion of the bracket member, each end of the strip of material being secured to the seat belt.

6. The improvement of claim 1, wherein the releasable coupling means includes a bracket member secured to the movable portion of the vehicle seat and defining an opening through which the seat belt passes, and a loop carried by the seat belt, the loop having dimensions such that it is not pulled through the opening under loads normally exerted on the seat belt by an occupant of the vehicle seat, the loop being deformed upon application of a load on the seat belt greater than the predetermined impact load so as to slip through the bracket member opening and release the occupant engaging portion of the seat belt.

7. The improvement of claim 6, wherein the releasable coupling means further includes a compressible resilient member received in the loop, the resilient member normally expanding the loop and being compressed upon application of a load on the seat belt greater than the predetermined impact load to permit deformation of the loop.

8. The improvement of claim 1, wherein the releasable coupling means includes a bracket member secured to the movable portion of the vehicle seat and defining an opening through which the seat belt passes, and means attaching a pair of spaced portions of the seat belt to each other so as to define a loop in the seat belt which encircles a portion of the bracket member, the attaching means releasing the portions of the seat belt upon application of a load on the seat belt greater than the predetermined impact load.

9. The improvement of claim 1, wherein the releasable coupling means includes a coupling member secured to the seat belt and to the movable portion of the vehicle seat, the coupling member being adapted to fail upon application of a load on the coupling member corresponding to a load on the seat belt greater than the predetermined impact load.

10. A seat belt arrangement for a vehicle seat, at least a portion of which is movable relative to at least a portion of a vehicle structure, comprising a seat belt, means anchoring the seat belt to the portion of the vehicle structure, and means releasably coupling the seat belt to the movable portion of the vehicle seat so as to provide slack in the seat belt between the anchoring means and the releasable coupling means to permit relative movement between the movable portion of the vehicle seat and the portion of the vehicle structure even when a portion of the seat belt is securely engaging an occupant of the seat, the portion of the seat belt adapted to engage an occupant of the vehicle seat being secured by the releasable coupling means to the movable portion of the seat under loads exerted on the seat belt up to a predetermined impact load, the releasable coupling means being adapted to release the occupant engaging portion of the seat belt, with the seat belt being unconstrained by any portion of the coupling means engaging the belt, in response to a load exerted on the seat belt exceeding the predetermined impact load so as to transfer the load on the seat belt from the movable portion of the vehicle seat to the anchoring means.

* * * * *

UNITED STATES PATENT AND TRADEMARK OFFICE
CERTIFICATE OF CORRECTION

PATENT NO. : 3,890,002
DATED : June 17, 1975
INVENTOR(S) : Terry L. Warmkessel

It is certified that error appears in the above-identified patent and that said Letters Patent are hereby corrected as shown below:

First page, in heading and in Item [75], "Warmskessel" should be --Warmkessel--;

First page, Item [73], "Truck" should be --Trucks--;

Col. 4, line 24, "seat 19" should read --seat 10--;

Col. 4, line 46, after "screw" insert --36--; and

Col. 9, line 12, "brackets" should read --bracket--.

Signed and Sealed this second Day of September 1975

[SEAL]

Attest:

RUTH C. MASON
Attesting Officer

C. MARSHALL DANN
Commissioner of Patents and Trademarks